Oct. 14, 1969      H. R. JOHNSON      3,472,476
SLIDE LOCK
Filed July 31, 1967      2 Sheets-Sheet 1
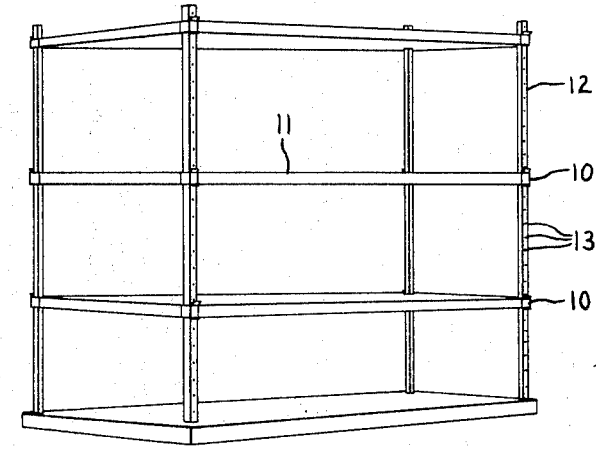
*Fig. 1*
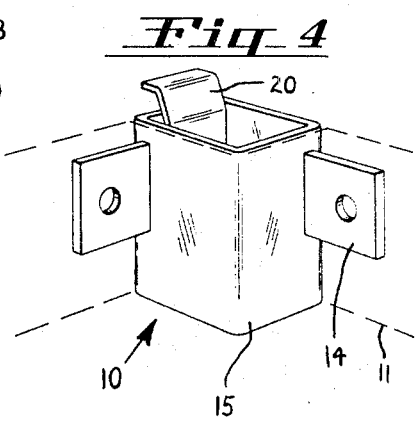
*Fig. 4*
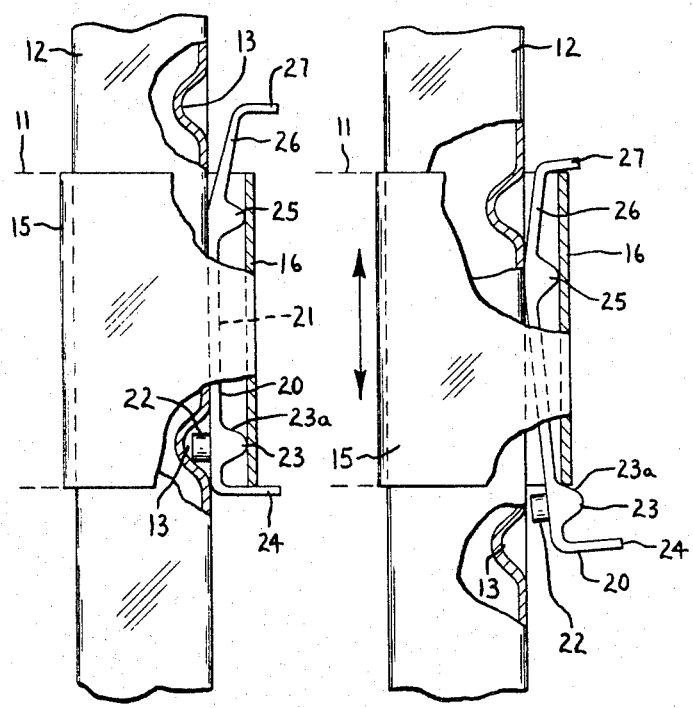
*Fig. 2*     *Fig. 3*
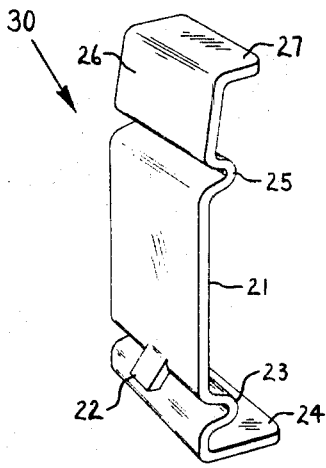
*Fig. 5*
INVENTOR.
HAROLD R. JOHNSON
BY
*Lee R. Schermerhorn*
Attorney Oct. 14, 1969          H. R. JOHNSON          3,472,476
                         SLIDE LOCK
Filed July 31, 1967                              2 Sheets-Sheet 2

INVENTOR.
HAROLD R. JOHNSON
BY
R. R. Schermerhorn
Attorney

United States Patent Office 3,472,476
Patented Oct. 14, 1969

3,472,476
SLIDE LOCK
Harold R. Johnson, 225 Kaiulani Ave.,
Honolulu, Hawaii 96815
Filed July 31, 1967, Ser. No. 657,255
Int. Cl. B65d 19/08
U.S. Cl. 248—245     8 Claims

ABSTRACT OF THE DISCLOSURE

A device for locking two relatively slidable parts in adjusted positions. A rocking latch bar in a slidable sleeve is arranged to engage holes or depressions in an elongated supporting member. The latch bar may be gravity operated as for supporting a chair seat or a shelf on a vertical supporting leg or post or it may be spring actuated for use on horizontal members. The slide lock may also be made as a buckle on a belt or strap for cargo strapping and other purposes.

BACKGROUND OF THE INVENTION

This invention relates to a device for locking two relatively slidable parts in adjusted positions.

The device is of general application and has many uses. It may be used, for example, to support adjustable height chair seats, scaffolding and shelving. It may also be applied to flexible members such as belts and straps as, for example, in cargo strapping.

Previous devices of this nature have been adapted for special purposes and are not of general application for a wide variety of purposes. They have generally been of complicated construction which is expensive to manufacture and likely to get out of order. Most prior devices are not adaptable for use in adjustable shelving. There is a need for an improved slide lock of simple construction which will overcome these objections and disadvantages in the prior art devices.

SUMMARY OF THE INVENTION

The present device comprises, essentially, merely a sleeve member which is slidable on a supporting member and contains a rocking latch bar which is securely engageable with the supporting member to hold the sleeve in adjusted position on the supporting member. When the supporting member is a vertical leg or post, the sleeve member may be incorporated in an adjustable height seat, scaffold or shelf or otherwise arranged to support a seat, scaffold or shelf for vertical adjustment. In such cases, the latch bar is gravity actuated to its locked position and is released by merely raising the seat or shelf. When the latch bar is thus released, the sleeve may be moved freely up and down on the supporting leg or post.

For use on horizontal supporting members, the latch bar is spring held in locked position, the sleeve then being movable only when the latch bar is manually released by manipulation. In another modification, the sleeve member is arranged to slide on a belt or strap. The sleeve may then be used to adjust the position of some third member relative to the belt or strap or it may be used for tightening a strap about a bundle as in cargo strapping. In such application the sleeve may be connected to one end of the strap as a buckle. Still other applications will suggest themselves to persons skilled in the art.

Objects of the invetnion are to provide an improved slide lock, to provide a slide lock having a gravity actuated latch bar for vertical applications, to provide a slide lock having a spring actuated latch bar for horizontal applications, to provide a slide lock for use on belts or straps, to provide a slide lock in the form of a buckle, and to provide a device of the type described which is of simple and inexpensive construction and having no parts which are likely to break or malfunction whereby the device is rugged and reliable and has a long life in heavy service.

The foregoing and other objects and advantages will become apparent and the invention will be better understood from the following description of certain preferred embodiments illustrated in the accompanying drawings. Various changes may be made, however, in the details of construction and arrangement of parts, and certain features may be used without others. All such modifications within the scope of the appended claims are included in the invention.

BRIEF DESCRIPTION OF THE DRAWINGS

FIGURE 1 is a perspective view showing adjustable shelving embodying the features of the invention;

FIGURE 2 is a fragmentary enlarged view, with parts broken away, showing one of the slide locks in FIGURE 1 in locked position on a post;

FIGURE 3 is a view similar to FIGURE 2, showing the slide lock in released position;

FIGURE 4 is a perspective view of one of the slide locks in FIGURE 1 removed from its post;

FIGURE 5 is a perspective view showing a modified form of latch bar;

DESCRIPTION OF THE PREFERRED EMBODIMENTS

Figure 7:
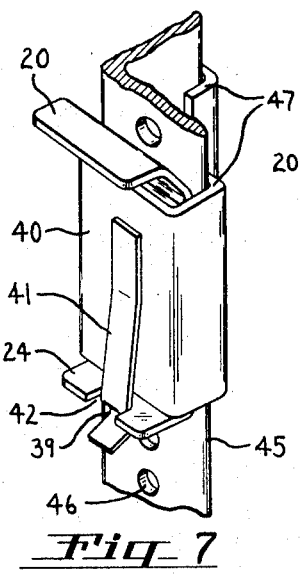
FIGURE 7 is a fragmentary perspective view showing a slide lock with a spring held latch bar.

In FIGURE 1, slide locks 10 support a plurality of shelves 11 for vertical adjustment on supporting posts 12. In this case, the posts 12 are rectangular tubular members having vertically spaced depressions 13 on one side thereof, as better shown in FIGURES 2 and 3. Each slide lock 10 comprises a rectangular sleeve 15 equipped with apertured ears 14 which are bolted to a notched corner of the shelf as shown in FIGURE 4. Each sleeve 15 is adapted to slide vertically on its post 12.

Each sleeve 15 has sliding engagement with the three sides of its post 12 which do not contain the depressions 13. In assembled position, the fourth side of the sleeve comprises a wall 16 which is spaced away from the adjacent side of the post to allow room for a floating and rocking latch bar 20.

Latch bar 20 has a straight and flat intermediate portion 21 which is provided at the lower end on its post side with a projection 22 to enter and lock into depressions 13. Opposite the projection 22 on the sleeve side of the latch bar is an outwardly projecting intermediate abutment 23. The lower extremity of the latch bar forms an outwardly projecting lower stop 24 a short distance below the abutment 23.

At the upper end of flat portion 21 is an outstanding fulcrum projection 25. Above fulcrum 25 the latch bar has an outwardly inclined cam portion 26 which terminates in an outwardly directed upper stop 27. The latch bar is free to float vertically within sleeve 15 between upper and lower limit positions as determined by the lower and upper stops 24 and 27 and is free to rock on fulcrum 25 when the sleeve is raised above abutment 23. For this purpose the distance between stops 24 and 27 is greater than the length of wall 16 and the distance between abutment 23 and fulcrum 25 is less than the length of wall 16.

As shown in FIGURE 2, the lower edge of the wall 16 of sleeve 15 supports the weight of shelf 11 on the lower stop 24 of the latch bar. In this position, the wall 16 overrides the abutment 23 so as to hold the projection 22 engaged in a depression 13. The parts are locked in this position by gravity so that sleeve 15 cannot slide downward on the post.

In order to unlock the latch bar, all that is necessary is to lift the shelf 11 as shown in FIGURE 3. Upward movement of sleeve 15 causes the lower edge of wall 16 to clear the abutment 23 and causes the upper edge of wall 16 to engage the inclined cam portion 26 of the latch bar. This cams the upper end of the latch bar inwardly toward the post, rocking the latch bar counterlockwise about its fulcrum 25 to withdraw projection 22 from depression 13. With the parts in FIGURE 3 position, the latch bar and sleeve are freely slidable up and down on the post to a selected position of vertical adjustment.

The shelf is locked in adjusted position during a lowering movement by pressing the lower end of the latch bar inward or to the left in FIGURE 3 so as to cause projection 22 to start to enter a depression 13. This arrests the downward movement of latch bar 20 and allows sleeve 15 to move downward on the latch bar until the lower edge of wall 16 encounters the lower stop 24. The upper surface of abutment 23 is preferably inclined downward at 23a so that the lower edge of wall 16 will cam the lower end of the latch bar inward as the sleeve slides downward over the latch bar. The parts are thereby restored to stable locked position as shown in FIGURE 2.

The latch bar 20 in FIGURES 2 and 3 is illustrated as it would be made by a casting process. It may also be made by forging, extrusion or stamping as shown at 30 in FIGURE 5 wherein the various parts described above are given the same reference numeral identification.

Figure 6:
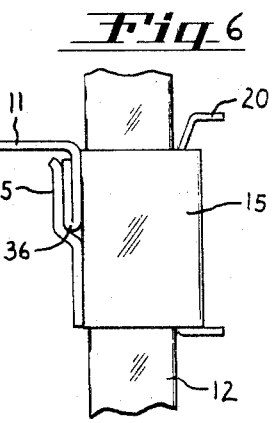
FIGURE 6 is an elevation view showing a slide lock having detachable connection with a shelf.

The slide lock illustrated in FIGURE 6 is the same as that just described in FIGURES 1 to 4 except that the ears 14 for bolted connection to the shelf are omitted. Instead, one side of sleeve 15 is provided with a tongue 35 to receive a downturned edge 36 on the shelf 11 whereby the shelf is readily removable from the sleeve. A chair seat, as in a child's high chair, or other structure, may also be supported as shown in FIGURES 4 and 6.

FIGURE 7 shows a modification in which the sleeve 40 is equipped with a leaf spring 41 to hold the lower end of latch bar 20 in locked position. Bottom abutment 24 is notched at 42 to receive a hooked nose 39 on the lower end of the spring. This embodiment is intended, primarily, for use on a horizontal supporting member where there is no gravity locking action but it may also be used on a vertical member as exemplified by the angle iron post 45. In this case, instead of locking depressions, the post is provided with holes 46 to receive the latch bar projection 22. Instead of being a tubular sleeve to completely encircle the post, in this case the sleeve 40 is equipped with flanges 47 which wrap partially around the flanges of the post to retain the slide on the post.

Figure 8:
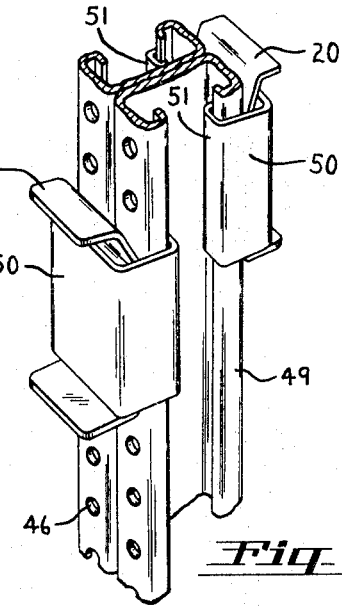
FIGURE 8 is a fragmentary perspective view showing a pair of slide locks adapted for use on an I-beam shape of post or column.

FIGURE 8 shows an adaptation for use on an I-beam shape of post 49. This type of post will accommodate a pair of sleeves 50 on its opposite sides, each having flanges 51 wrapping partially around portions of the post flange to retain the sleeve on the post. This arrangement is useful for shelving or cabinets having intermediate posts between the corner posts. The term sleeve is regarded as properly applied to parts 40 and 50 in FIGURES 7 and 8 even though these parts do not wrap entirely around their supporting posts.

Figure 9:
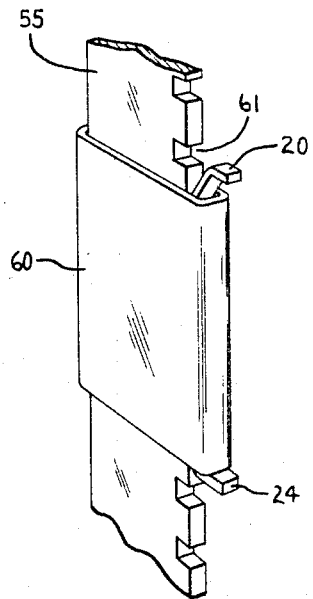
FIGURE 9 is a fragmentary perspective view of a slide lock adapted for use on a flat plate type of post.

FIGURE 9 shows an adaptation for use on a flat bar type of post 55. In this case, the sleeve 60 is tubular to completely encircle the post and one edge of the post is equipped with notches 61 for engagement with the latch bar projection 22.

The modifications in FIGURES 7 to 9 do not show specific means on the sleeve to support a shelf or other structure. It is understood that the sleeves in these figures may be equipped optionally with apertured ears 14 as shown in FIGURE 4, tongues 35 as shown in FIGURE 6, or other suitable means to serve the intended purpose. It is further understood that the spring 41 may be applied to the sleeves 50 and 60 in FIGURES 8 and 9 if desired and that the supporting members 49 and 55 may then be horizontal supporting members instead of vertical posts.

Figure 10:
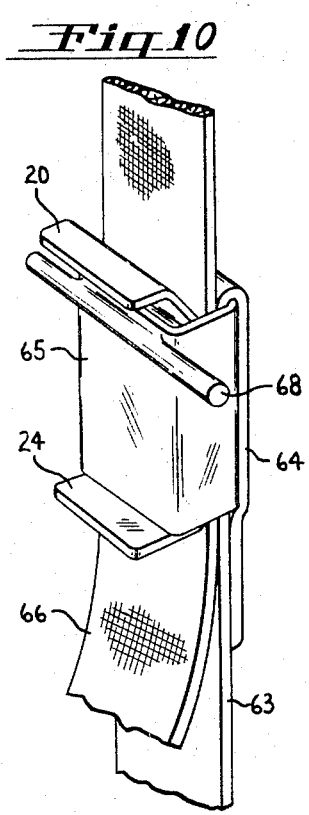
FIGURE 10 is a fragmentary perspective view showing a slide lock adapted for use as a buckle on a cargo binding strap.
Figure 11:
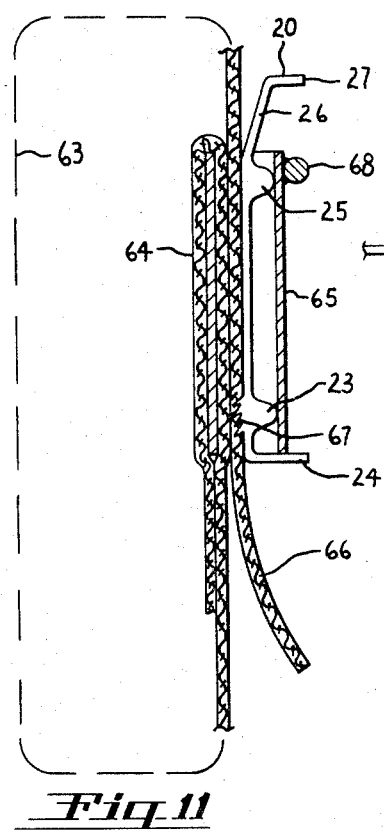
FIGURE 11 is a sectional view of the slide lock shown in FIGURE 10.

FIGURES 10 and 11 show an adaptation for cargo strapping and other similar purposes. A loop of strap 63 encircling a bound bundle or box has one end 64 secured to a tubular sleeve 65. The free end 66 of the strap passes through sleeve 65 alongside its latch bar 20. The latch bar may be equipped with a projection 22 as in FIGURE 2 to engage holes in the strap if desired but, in this case, teeth 67 provide the locking function. Alternatively, the teeth 67 may be replaced by a knurled or otherwise roughened surface for some purposes.

When the free end 66 of the strap is pulled through sleeve 65 to tension the strap about the bundle, the strap movement pulls latch bar 20 downward in the sleeve to release its grip on the strap, rocking the latch bar on its fulcrum 25 the same as shown in FIGURE 3. When free end 66 is released, the bundle tension in loop 63 will pull end 66 a short distance back through sleeve 65, moving the latch bar 20 upward with it until bottom abutment 24 encounters the lower end of sleeve 65 as shown in FIGURE 2. As abutment 23 is cammed under the lower end of sleeve 65, the latch bar is rocked clockwise on its abutment 25, causing the teeth 67 to bite into the strap and prevent further slippage of the strap through the sleeve. This slide lock embodiment is in the nature of a buckle and to facilitate tightening of the strap in the manner described, the sleeve 65 is preferably provided with a cross bar 68 or other suitable handle means for grasping the sleeve.

To release the strap it is only necessary to again tension the free end 66 and pull it a short distance through the sleeve. This sliding strap movement pulls the latch bar 20 downward, causing abutment 23 to clear the lower end of the sleeve. In this movement the upper end of sleeve 65 engages the inclined portion 26 of the latch bar and cams the upper end of the latch bar inwardly in counterclockwise rotation as described in connection with FIGURE 3, to disengage teeth 67 from the strap. If the teeth are deeply embedded in the strap, the release action may be assisted by pressing the upper end of the latch bar to the left in FIGURE 11 simultaneously with the tensioning of the free end 66 of the strap.

Instead of being attached to one end of the strap as a buckle, the sleeve 65 may also be used as a support for some structure or object on a vertically hanging strap wherein the strap functions as a supporting post as previously described.

Still other applications of the present slide lock will suggest themselves to persons skilled in the art.

Having now described my invention and in what manner the same may be used, what I claim as new and desire to protect by Letters Patent is:

1. A slide lock comprising a slide member arranged for sliding support on an elongated support member, said slide member having a wall arranged to extend in parallel spaced relation to the support member, and a floating latch bar extending through said space in a longitudinal direction relative to said support member and being longitudinally slidable in said space, said latch bar having one face confronting said support member and an opposite face confronting said wall, a projection on said one face adjacent one end of said latch bar engageable with said support member, an abutment projecting from said opposite face adjacent said one end of said latch bar engageable with said wall, a stop on said one end of said latch bar engageable with the corresponding end of said wall, a fulcrum projecting from said opposite face of said latch bar adjacent the opposite end of the latch bar and engageable with said wall, and a stop on said opposite end of said latch bar engageable with the opposite end of said wall, said stops being spaced apart a distance greater than the length of said wall to permit said latch bar to slide longitudinally in said space said abutment and fulcrum being spaced apart from each other a distance less than the length of said wall, said latch bar having a locking position wherein said abutment and fulcrum are both confined behind said wall to hold said projection in engagement with said support member, and said latch bar having a release position wherein said abutment is shifted beyond said one end of said wall allowing the latch bar to rock on said fulcrum and disengage said projection from said support member.

2. A slide lock as defined in claim 1 including an inclined cam surface on said latch bar engageable by said slide member to rock said latch bar to said release position when said abutment is shifted outside of said sleeve slide member.

3. A slide lock as defined in claim 1 including a spring on said slide member arranged to hold said latch bar in said locked position.

4. A slide lock as defined in claim 1, said projection being arranged to enter a depression or hole in said support member.

5. A slide lock as defined in claim 1, said projection comprising a tooth to impale a strap type support member.

6. A slide lock as defined in claim 1, said support member comprising a strap and said slide lock forming a buckle on one end of said strap.

7. A slide lock as defined in claim 1, said support member comprising a post and said slide lock forming a support for a structure on said post.

8. A slide lock arranged for relative sliding movement on an elongated member having at least one recess in one side thereof, said slide lock having a wall in parallel spaced relation to said recessed side of said elongated member, a floating latch bar extending through said space in a longitudinal direction relative to said elongated member, stops on opposite ends of said latch bar engageable with opposite ends of said wall, said stops being spaced apart a distance greater than the length of said wall permitting longitudinal sliding movement of said latch bar in said space, said latch bar having an inner face confronting said recessed side of said elongated member and an outer face confronting said wall, a projection on said inner face adjacent one end of said latch bar engageable with said recess, an abutment projecting from said outer face adjacent said one end of said latch bar engageable with said wall, and a fulcrum projecting from said outer face adjacent the opposite end of said latch bar and engageable with said wall, said abutment and fulcrum being spaced apart from each other a distance less than the length of said wall, said latch bar having a locking position wherein said abutment and fulcrum are both confined behind said wall to hold said projection engaged in said recess, and said latch bar having a release position wherein said abutment is shifted beyond said one end of said wall allowing the latch bar to rock on said fulcrum and disengage said projection from said recess.

References Cited
UNITED STATES PATENTS

| | | | |
|---|---|---|---|
| 980,077 | 12/1910 | Dunn | 24—194 |
| 1,639,609 | 8/1927 | Hofland | 24—194 |
| 2,932,481 | 4/1960 | Breer et al. | 248—408 X |
| 3,245,365 | 4/1966 | Doherty | 211—176 X |

ROY D. FRAZIER, Primary Examiner

J. FRANKLIN FOSS, Assistant Examiner

U.S. Cl. X.R.

24—194; 108—144; 211—134; 248—125